(12) United States Patent
Milevski et al.

(10) Patent No.: US 10,582,328 B2
(45) Date of Patent: *Mar. 3, 2020

(54) AUDIO RESPONSE BASED ON USER WORN MICROPHONES TO DIRECT OR ADAPT PROGRAM RESPONSES SYSTEM AND METHOD

(71) Applicant: BRAGI GmbH, München (DE)

(72) Inventors: Veniamin Milevski, München (DE); Peter Vincent Boesen, München (DE)

(73) Assignee: BRAGI GmbH, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,887

(22) Filed: Jul. 5, 2017

(65) Prior Publication Data

US 2018/0014140 A1    Jan. 11, 2018

Related U.S. Application Data

(60) Provisional application No. 62/358,985, filed on Jul. 6, 2016.

(51) Int. Cl.
*H04S 7/00* (2006.01)
*H04R 1/10* (2006.01)
*G11B 20/10* (2006.01)

(52) U.S. Cl.
CPC ........ *H04S 7/304* (2013.01); *G11B 20/10527* (2013.01); *H04R 1/1016* (2013.01);
(Continued)

(58) Field of Classification Search
CPC .......... H04S 5/005; H04S 7/302; H04S 7/303; H04S 7/304; H04S 2420/01;
(Continued)

(56) References Cited

U.S. PATENT DOCUMENTS

| 2,325,590 A | 8/1943 | Carlisle et al. |
| 2,430,229 A | 11/1947 | Kelsey |

(Continued)

FOREIGN PATENT DOCUMENTS

| CN | 204244472 U | 4/2015 |
| CN | 104683519 A | 6/2015 |

(Continued)

OTHER PUBLICATIONS

Waves, "Virtual Mix Room User Guide", Snapshot generated Apr. 19, 2016, web.archive.org, all pages. (Year: 2016).*

(Continued)

*Primary Examiner* — Jesse A Elbin
(74) *Attorney, Agent, or Firm* — Goodhue, Coleman & Owens, P.C.

(57) ABSTRACT

A system, method, and wireless earpieces for communicating with a virtual reality headset. A position and an orientation of a head of a user are detected utilizing at least wireless earpieces. Audio content is received. The audio content is enhanced utilizing the position and the orientation of the head of the user. The audio content is immediately delivered to the user. The method may further include communicating the position and the orientation of the head of the user to the virtual reality headset. The audio content may be based on the orientation and position of the head of the user.

7 Claims, 5 Drawing Sheets

(52) U.S. Cl.
CPC ....... *H04R 1/1091* (2013.01); *H04R 2420/07* (2013.01); *H04S 2420/11* (2013.01)

(58) Field of Classification Search
CPC ............... H04R 1/1016; G06T 19/006; G02B 27/0093; G02B 2027/0187; H04M 3/568; G06F 3/012; G06F 3/04815; H04N 7/157; G06K 9/00228
USPC ........................ 700/94; 381/17, 310; 345/633
See application file for complete search history.

(56) References Cited

U.S. PATENT DOCUMENTS

| | | | |
|---|---|---|---|
| 3,047,089 A | 7/1962 | Zwislocki | |
| D208,784 S | 10/1967 | Sanzone | |
| 3,586,794 A | 6/1971 | Michaelis | |
| 3,934,100 A | 1/1976 | Harada | |
| 3,983,336 A | 9/1976 | Malek et al. | |
| 4,069,400 A | 1/1978 | Johanson et al. | |
| 4,150,262 A | 4/1979 | Ono | |
| 4,334,315 A | 6/1982 | Ono et al. | |
| D266,271 S | 9/1982 | Johanson et al. | |
| 4,375,016 A | 2/1983 | Harada | |
| 4,588,867 A | 5/1986 | Konomi | |
| 4,617,429 A | 10/1986 | Bellafiore | |
| 4,654,883 A | 3/1987 | Iwata | |
| 4,682,180 A | 7/1987 | Gans | |
| 4,791,673 A | 12/1988 | Schreiber | |
| 4,852,177 A | 7/1989 | Ambrose | |
| 4,865,044 A | 9/1989 | Wallace et al. | |
| 4,984,277 A | 1/1991 | Bisgaard et al. | |
| 5,008,943 A | 4/1991 | Arndt et al. | |
| 5,185,802 A | 2/1993 | Stanton | |
| 5,191,602 A | 3/1993 | Regen et al. | |
| 5,201,007 A | 4/1993 | Ward et al. | |
| 5,201,008 A | 4/1993 | Arndt et al. | |
| D340,286 S | 10/1993 | Seo | |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart | |
| 5,347,584 A | 9/1994 | Narisawa | |
| 5,363,444 A | 11/1994 | Norris | |
| D367,113 S | 2/1996 | Weeks | |
| 5,497,339 A | 3/1996 | Bernard | |
| 5,606,621 A | 2/1997 | Reiter et al. | |
| 5,613,222 A | 3/1997 | Guenther | |
| 5,654,530 A | 8/1997 | Sauer et al. | |
| 5,692,059 A | 11/1997 | Kruger | |
| 5,721,783 A | 2/1998 | Anderson | |
| 5,748,743 A | 5/1998 | Weeks | |
| 5,749,072 A | 5/1998 | Mazurkiewicz et al. | |
| 5,771,438 A | 6/1998 | Palermo et al. | |
| D397,796 S | 9/1998 | Yabe et al. | |
| 5,802,167 A | 9/1998 | Hong | |
| D410,008 S | 5/1999 | Almqvist | |
| 5,929,774 A | 7/1999 | Charlton | |
| 5,933,506 A | 8/1999 | Aoki et al. | |
| 5,949,896 A | 9/1999 | Nageno et al. | |
| 5,987,146 A | 11/1999 | Pluvinage et al. | |
| 6,021,207 A | 2/2000 | Puthuff et al. | |
| 6,054,989 A | 4/2000 | Robertson et al. | |
| 6,081,724 A | 6/2000 | Wilson | |
| 6,094,492 A | 7/2000 | Boesen | |
| 6,111,569 A | 8/2000 | Brusky et al. | |
| 6,112,103 A | 8/2000 | Puthuff | |
| 6,157,727 A | 12/2000 | Rueda | |
| 6,167,039 A | 12/2000 | Karlsson et al. | |
| 6,181,801 B1 | 1/2001 | Puthuff et al. | |
| 6,208,372 B1 | 3/2001 | Barraclough | |
| 6,230,029 B1 | 5/2001 | Yagiazaryan et al. | |
| 6,275,789 B1 | 8/2001 | Moser et al. | |
| 6,339,754 B1 | 1/2002 | Flanagan et al. | |
| D455,835 S | 4/2002 | Anderson et al. | |
| 6,408,081 B1 | 6/2002 | Boesen | |
| 6,424,820 B1 | 7/2002 | Burdick et al. | |
| D464,039 S | 10/2002 | Boesen | |
| 6,470,893 B1 | 10/2002 | Boesen | |
| D468,299 S | 1/2003 | Boesen | |
| D468,300 S | 1/2003 | Boesen | |
| 6,542,721 B2 | 4/2003 | Boesen | |
| 6,560,468 B1 | 5/2003 | Boesen | |
| 6,654,721 B2 | 11/2003 | Handelman | |
| 6,664,713 B2 | 12/2003 | Boesen | |
| 6,690,807 B1 | 2/2004 | Meyer | |
| 6,694,180 B1 | 2/2004 | Boesen | |
| 6,718,043 B1 | 4/2004 | Boesen | |
| 6,738,485 B1 | 5/2004 | Boesen | |
| 6,748,095 B1 | 6/2004 | Goss | |
| 6,754,358 B1 | 6/2004 | Boesen et al. | |
| 6,784,873 B1 | 8/2004 | Boesen et al. | |
| 6,823,195 B1 | 11/2004 | Boesen | |
| 6,852,084 B1 | 2/2005 | Boesen | |
| 6,879,698 B2 | 4/2005 | Boesen | |
| 6,892,082 B2 | 5/2005 | Boesen | |
| 6,920,229 B2 | 7/2005 | Boesen | |
| 6,952,483 B2 | 10/2005 | Boesen et al. | |
| 6,987,986 B2 | 1/2006 | Boesen | |
| 7,010,137 B1 | 3/2006 | Leedom et al. | |
| 7,113,611 B2 | 9/2006 | Leedom et al. | |
| D532,520 S | 11/2006 | Kampmeier et al. | |
| 7,136,282 B1 | 11/2006 | Rebeske | |
| 7,203,331 B2 | 4/2007 | Boesen | |
| 7,209,569 B2 | 4/2007 | Boesen | |
| 7,215,790 B2 | 5/2007 | Boesen et al. | |
| D549,222 S | 8/2007 | Huang | |
| D554,756 S | 11/2007 | Sjursen et al. | |
| 7,403,629 B1 | 7/2008 | Aceti et al. | |
| D579,006 S | 10/2008 | Kim et al. | |
| 7,463,902 B2 | 12/2008 | Boesen | |
| 7,508,411 B2 | 3/2009 | Boesen | |
| D601,134 S | 9/2009 | Elabidi et al. | |
| 7,825,626 B2 | 11/2010 | Kozisek | |
| 7,965,855 B1 | 6/2011 | Ham | |
| 7,979,035 B2 | 7/2011 | Griffin et al. | |
| 7,983,628 B2 | 7/2011 | Boesen | |
| D647,491 S | 10/2011 | Chen et al. | |
| 8,095,188 B2 | 1/2012 | Shi | |
| 8,108,143 B1 | 1/2012 | Tester | |
| 8,140,357 B1 | 3/2012 | Boesen | |
| D666,581 S | 9/2012 | Perez | |
| 8,300,864 B2 | 10/2012 | Müllenborn et al. | |
| 8,406,448 B2 | 3/2013 | Lin | |
| 8,436,780 B2 | 5/2013 | Schantz et al. | |
| D687,021 S | 7/2013 | Yuen | |
| 8,719,877 B2 | 5/2014 | VonDoenhoff et al. | |
| 8,767,968 B2 * | 7/2014 | Flaks .................... | A63F 13/54 345/633 |
| 8,774,434 B2 | 7/2014 | Zhao et al. | |
| 8,831,266 B1 | 9/2014 | Huang | |
| 8,891,800 B1 | 11/2014 | Shaffer | |
| 8,994,498 B2 | 3/2015 | Agrafioti et al. | |
| D728,107 S | 4/2015 | Martin et al. | |
| 9,013,145 B2 | 4/2015 | Castillo et al. | |
| 9,037,125 B1 | 5/2015 | Kadous | |
| D733,103 S | 6/2015 | Jeong et al. | |
| 9,081,944 B2 | 7/2015 | Camacho et al. | |
| 9,510,159 B1 | 11/2016 | Cuddihy et al. | |
| D773,439 S | 12/2016 | Walker | |
| D775,158 S | 12/2016 | Dong et al. | |
| D777,710 S | 1/2017 | Palmborg et al. | |
| 9,612,722 B2 * | 4/2017 | Miller .................... | G06F 9/452 |
| D788,079 S | 5/2017 | Son et al. | |
| 2001/0005197 A1 | 6/2001 | Mishra et al. | |
| 2001/0027121 A1 | 10/2001 | Boesen | |
| 2001/0043707 A1 | 11/2001 | Leedom | |
| 2001/0056350 A1 | 12/2001 | Calderone et al. | |
| 2002/0002413 A1 | 1/2002 | Tokue | |
| 2002/0007510 A1 | 1/2002 | Mann | |
| 2002/0010590 A1 | 1/2002 | Lee | |
| 2002/0030637 A1 | 3/2002 | Mann | |
| 2002/0046035 A1 | 4/2002 | Kitahara et al. | |
| 2002/0057810 A1 | 5/2002 | Boesen | |
| 2002/0076073 A1 | 6/2002 | Taenzer et al. | |

(56) References Cited

U.S. PATENT DOCUMENTS

| | | |
|---|---|---|
| 2002/0118852 A1 | 8/2002 | Boesen |
| 2002/0150254 A1* | 10/2002 | Wilcock .................. G06F 3/167 |
| | | 381/1 |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1 | 6/2008 | LeBoeuf et al. |
| 2008/0254780 A1 | 10/2008 | Kuhl et al. |
| 2008/0255430 A1 | 10/2008 | Alexandersson et al. |
| 2009/0003620 A1 | 1/2009 | McKillop et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0191920 A1 | 7/2009 | Regen et al. |
| 2009/0245559 A1 | 10/2009 | Boltyenkov et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0320961 A1 | 12/2010 | Castillo et al. |
| 2011/0286615 A1 | 11/2011 | Olodort et al. |
| 2012/0057740 A1 | 3/2012 | Rosal |
| 2013/0316642 A1 | 11/2013 | Newham |
| 2013/0329051 A1* | 12/2013 | Boesen .................. H04M 1/05 |
| | | 348/159 |
| 2013/0346168 A1 | 12/2013 | Zhou et al. |
| 2014/0072146 A1 | 3/2014 | Itkin et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0163771 A1 | 6/2014 | Demeniuk |
| 2014/0185828 A1 | 7/2014 | Helbling |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0348367 A1 | 11/2014 | Vavrus et al. |
| 2015/0028996 A1 | 1/2015 | Agrafioti et al. |
| 2015/0110587 A1 | 4/2015 | Hori |
| 2015/0148989 A1 | 5/2015 | Cooper et al. |
| 2015/0245127 A1 | 8/2015 | Shaffer |
| 2016/0033280 A1 | 2/2016 | Moore et al. |
| 2016/0072558 A1 | 3/2016 | Hirsch et al. |
| 2016/0073189 A1 | 3/2016 | Lindén et al. |
| 2016/0125892 A1 | 5/2016 | Bowen et al. |
| 2016/0154241 A1* | 6/2016 | Alhashim .......... G02B 27/0172 |
| | | 345/8 |
| 2016/0360350 A1 | 12/2016 | Watson et al. |
| 2017/0078780 A1 | 3/2017 | Qian et al. |
| 2017/0111726 A1 | 4/2017 | Martin et al. |
| 2017/0155992 A1 | 6/2017 | Perianu et al. |
| 2017/0347348 A1* | 11/2017 | Masaki ............. H04W 72/0406 |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

"ReSound LiNX2", "http://ww1.resound.com/en/hearing-aids/resound-hearing-aids/linx2#.Vpj_SRUrKUk", 2017, 6 pages.

Akkermans, "Acoustic Ear Recognition for Person Identification", Automatic Identification Advanced Technologies, 2005 pp. 219-223.

Announcing the $3,333,333 Stretch Goal (Feb. 24, 2014).

Ben Coxworth: "Graphene-based ink could enable low-cost, foldable electronics", "Journal of Physical Chemistry Letters", Northwestern University, (May 22, 2013).

Blain: "World's first graphene speaker already superior to Sennheiser MX400", htt://www.gizmag.com/graphene-speaker-beats-sennheiser-mx400/31660, (Apr. 15, 2014).

BMW, "BMW introduces BMW Connected—The personalized digital assistant", "http://bmwblog.com/2016/01/05/bmw-introduces-bmw-connected-the-personalized-digital-assistant", (Jan. 5, 2016).

BRAGI is on Facebook (2014).

BRAGI Update—Arrival of Prototype Chassis Parts—More People—Awesomeness (May 13, 2014).

BRAGI Update—Chinese New Year, Design Verification, Charging Case, More People, Timeline(Mar. 6, 2015).

BRAGI Update—First Sleeves From Prototype Tool—Software Development Kit (Jun. 5, 2014).

BRAGI Update—Let's Get Ready to Rumble, A Lot to Be Done Over Christmas (Dec. 22, 2014).

BRAGI Update—Memories From April—Update on Progress (Sep. 16, 2014).

BRAGI Update—Memories from May—Update on Progress—Sweet (Oct. 13, 2014).

BRAGI Update—Memories From One Month Before Kickstarter—Update on Progress (Jul. 10, 2014).

BRAGI Update—Memories From the First Month of Kickstarter—Update on Progress (Aug. 1, 2014).

BRAGI Update—Memories From the Second Month of Kickstarter—Update on Progress (Aug. 22, 2014).

BRAGI Update—New People @BRAGI—Prototypes (Jun. 26, 2014).

BRAGI Update—Office Tour, Tour to China, Tour to CES (Dec. 11, 2014).

BRAGI Update—Status on Wireless, Bits and Pieces, Testing—Oh Yeah, Timeline(Apr. 24, 2015).

BRAGI Update—The App Preview, The Charger, The SDK, BRAGI Funding and Chinese New Year (Feb. 11, 2015).

BRAGI Update—What We Did Over Christmas, Las Vegas & CES (Jan. 19, 2014).

BRAGI Update—Years of Development, Moments of Utter Joy and Finishing What We Started(Jun. 5, 2015).

BRAGI Update—Alpha 5 and Back to China, Backer Day, on Track(May 16, 2015).

(56) References Cited

OTHER PUBLICATIONS

BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update13 Getting Close(Aug. 6, 2015).
BRAGI Update—On Track, Design Verification, How It Works and What's Next(Jul. 15, 2015).
BRAGI Update—On Track, on Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Davies, "Goodie Cardboard adds spatial sound for more immersive VR", "https://www.slashgear.com/google-cardboard-adds-spatial-sound-for-more-immersive-vr-13423072/", Jan. 13, 2016, 10 pages.
Healthcare Risk Management Review, "Nuance updates computer-assisted physician documentation solution" (Oct. 20, 2016).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, Californa (2017).
Last Push Before the Kickstarter Campaign Ends on Monday 4pm CET (Mar. 28, 2014).
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Weisiger; "Conjugated Hyperbilirubinemia", Jan. 5, 2016.

* cited by examiner

INERTIAL SENSORS(S)
(ACCELEROMETER, MAGNETOMETER, GYRO)
240

BIOMETRIC SENSORS(S)
(PULSE OXIMETER, TEMPERATURE SENSOR,
PHYSIOLOGICAL SENSOR)
242

MICROPHONE(S)
243

CAMERA(S)
239

SENSORS
217

AUDIO RESPONSE BASED ON USER WORN MICROPHONES TO DIRECT OR ADAPT PROGRAM RESPONSES SYSTEM AND METHOD

PRIORITY STATEMENT

This application claims priority to U.S. Provisional Patent Application 62/358,985, filed on Jul. 6, 2016, and entitled Audio Response Based on User Worn Microphones to Direct or Adapt Program Responses System and Method, hereby incorporated by reference in its entirety.

BACKGROUND

I. Field of the Disclosure

The illustrative embodiments relate to audio communications within virtual reality systems. More specifically, but not exclusively, the illustrative embodiments relate to interactions between one or more users, wireless earpieces, and virtual reality systems.

II. Description of the Art

The growth of virtual reality technology is growing nearly exponentially. This growth is fostered by the decreasing size of microprocessors, circuitry boards, projectors, displays, chips, and other components. Virtual reality systems, such as headsets, are decreasing in size and increasing in functionality, but are still bulky and heavy. The additional mass of headphone units worn by a user may further unbalance motion of the user's head when utilizing a virtual reality system. Tracking the location, position, motion, acceleration, and orientation, such as a user's head movements relative to the virtual reality environment may also be difficult. In addition, some existing systems and devices, such as external microphones, have significant latency when sending and receiving audio communications.

SUMMARY OF THE DISCLOSURE

Therefore, it is a primary object, feature, or advantage to improve over the state of the art.

It is a further object, feature, or advantage to provide ear worn microphones which delivers voice inputs with reduced latency.

It is a still further object, feature, or advantage

One embodiment provides a system, method, and wireless earpieces for communicating with a virtual reality headset. A position and an orientation of a head of a user are detected utilizing at least wireless earpieces. Audio content is received. The audio content is enhanced utilizing the position and the orientation of the head of the user. The audio content is immediately delivered to the user. Another embodiment provides wireless earpieces. The wireless earpieces include a processor for executing a set of instructions and a memory for storing the set of instructions. The set of instructions are executed to perform the method described above.

Yet another embodiment provides a virtual reality system. The virtual reality system includes a virtual reality headset for displaying a virtual reality environment to a user. The virtual reality system also includes wireless earpieces that include sensors that detect a position and an orientation of a head of a user and two or more microphones including an ear-bone microphone and an external microphone that receive first audio content from the user. The wireless earpieces receive second audio content from the virtual reality headset, the wireless earpieces enhance the second audio content utilizing the position and the orientation of the head of the user and play the second audio content to the user

BRIEF DESCRIPTION OF THE DRAWINGS

Illustrated embodiments of the present invention are described in detail below with reference to the attached drawing figures, which are incorporated by reference herein, and where:

FIG. 4 illustrates examples of various types of sensors.

DETAILED DESCRIPTION OF THE DISCLOSURE

Figure 1:
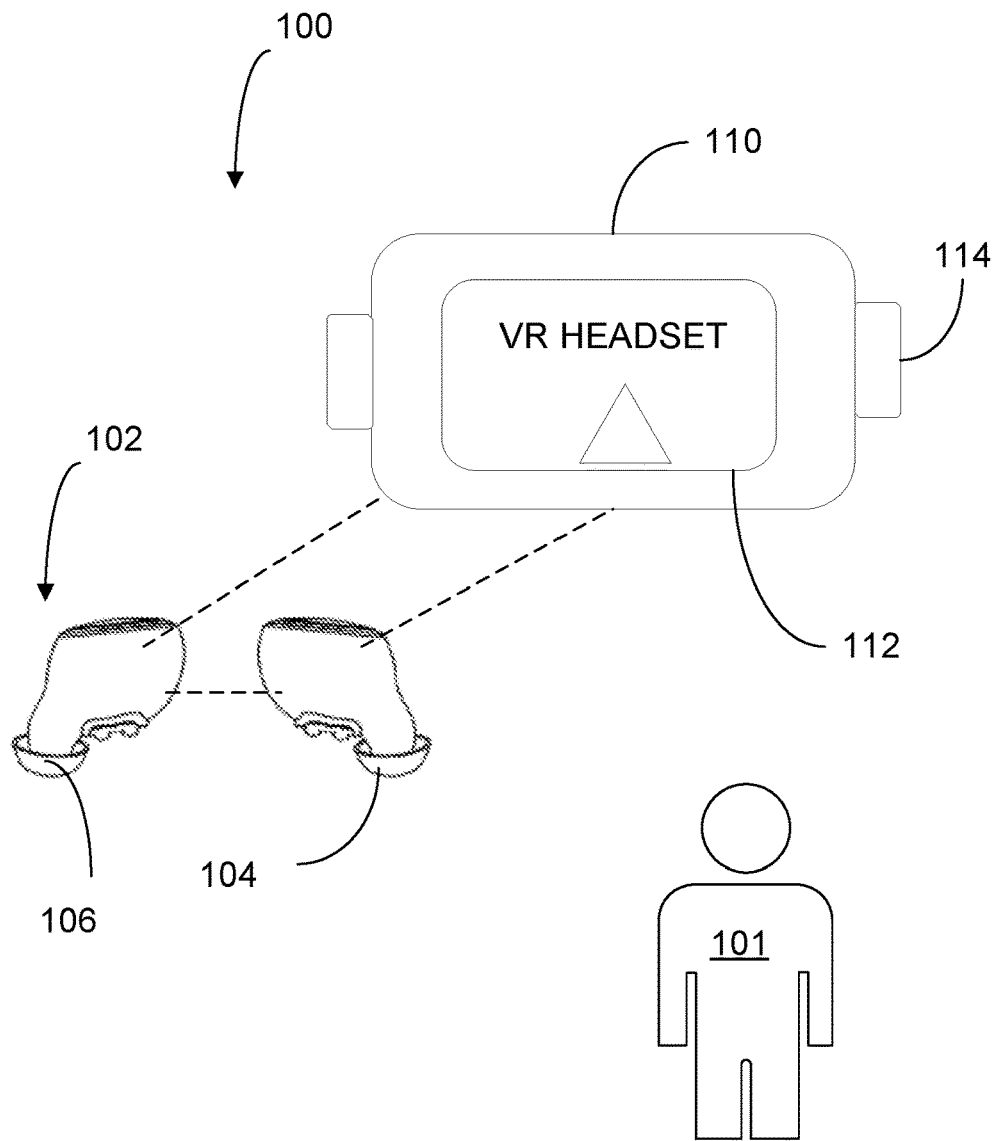
FIG. 1 is a pictorial representation of a virtual reality system in accordance with an illustrative embodiment.

The illustrative embodiments provide a system and method for audio communications between wireless earpieces and a virtual reality system, such as a virtual reality headset. The virtual reality headset may communicate with the wireless earpieces wirelessly or utilizing a wired connection. For example, ports and interfaces, such as micro-USB connectors may be utilized to connect the wireless earpieces to the virtual reality system. In another example, a wireless protocol, standard, connection, or link, such as Bluetooth or BLE may be utilized.

The illustrative embodiments may be utilized for entertainment, scientific, educational, or commercial applications. Virtual reality headsets, such as those produced by Google, HTC, Samsung, oculus, Sony, Microsoft, and so forth, may present any number of two-dimensional or three-dimensional visualizations to the user. The illustrative embodiments minimize the existing mass problems with bulky over-ear headphones or other audio systems. As a result, the characteristics of angular momentum associated with the user's head are not increased significantly decreasing the effects of torque and neck and head strain that may be associated with such virtual reality systems.

In addition, the user may not be required to utilize microphones that sit on a desk or are externally positioned from the user decreasing the effectiveness of the microphone. For example, many remotely positioned microphones do not have any additional sensors and their remote position may increase latency and delay when sensing various audio inputs from the user, environment, or so forth. Such a placement of the microphones may also introduce noise issues. According to one aspect, a virtual reality system is provided to incorporate position, orientation, movement, and acceleration (e.g., angular, linear, etc.) as part of the user input, responses, and feedback. As a result, the audio and visual information presented to the user may be adjusted in response to audio input received from the user as well as the corresponding user information including position, orientation, movement, and acceleration.

The wireless earpieces may include any number of sensors that may communicate with the sensors, systems and components of the virtual reality headset to further enhance the user's experience. In one embodiment, the sensors of the wireless earpieces may include accelerometers, gyroscopes, magnetometers, optical sensors, pulse oximeters, GPS chips, thermometers, and so forth. The data acquired by the sensors may be utilized to determine the user's condition, characteristics, position, orientation, movement, acceleration, location, or so forth. As a result, the data may be utilized to enhance the user's experience within the virtual reality environment. In addition, the sensors provide data that enhances sensor measurements of the virtual reality headset. The precise determination of the user's location, orientation, movement, and position may also be utilized to provide more accurate three-dimensional spatial sound imaging for the user. For example, allowable or communicated content, actions, and processes implemented by the virtual reality headset may vary based on the applicable user information In addition, the sensors may be utilized to sense any number of biometric readings or information, such as heart rate, respiratory rate, blood, or skin physiology, or other biometric data. This information may be utilized to determine whether the user is safe in the virtual reality environment, enjoying a game, or if the user is stressed or fatigued. Besides being integrated with the virtual reality headset, the wireless earpieces may be utilized to make and receive communications (e.g., telephone calls, transcribed text messages, audio/tactile alerts, etc.), play music, filter or block sound, amplify sounds, or so forth.

The wireless earpieces may be utilized for daily activities, such as gaming, business communications, exercising, phone calls, travel, and so forth. The wireless earpieces may then also serve a dual-purpose by integrating as an audio portion of a virtual reality system. As a result, more expensive audio components are not required reducing the cost and weight of the virtual reality system. The user may be relieved of significant weight and strain by utilizing the reduced footprint of the wireless earpieces. In addition, the virtual reality system may include a stand-alone power source or battery that may be utilized to power the wireless earpieces on the fly. The voice and audio inputs sensed by the wireless earpieces are processed with minimal latency due to positions of the microphones within the wireless earpieces at the lateral and medial segments as positioned within the ears of the user. The microphone and other sensor inputs provide enhanced input modality to the programs and processes implemented by the wireless earpieces.

FIG. 1 is a pictorial representation of a virtual reality system 100 in accordance with an illustrative embodiment. The virtual reality system 100 may include any number of devices, components, systems, and participants. In one embodiment, the virtual reality system 100 used by a user 101 may include wireless earpieces 102 including a right earpiece 104 and a left earpiece 106, wireless headset 110 including a visor 112, and a strap 114. The wireless earpieces 102 may be referred to as a pair or set (wireless earpieces 102) or singularly (wireless earpiece 102, right earpiece 104, left earpiece 106).

The description may also refer to components and functionality of each of the wireless earpieces 102 collectively or individually. In one embodiment, the wireless earpieces 102 include a left earpiece and a right earpiece configured to fit into ears of a user 101. The wireless earpieces 102 are shown separately from their positioning within the ears of the user 101 for purposes of simplicity.

The wireless earpieces 102 are configured to play audio associated with visual content presented by the virtual reality headset 110. The wireless earpieces 102 may be configured to play music or audio, receive and make phone calls or other communications, determine ambient environmental readings (e.g., temperature, altitude, location, speed, heading, etc.), read user biometrics and actions (e.g., heart rate, motion, sleep, blood oxygenation, calories burned, etc.), and communicate content audibly, tactilely, and visually.

The wireless earpieces 102 may include interchangeable parts that may be adapted to fit the needs of the user 101. For example, sleeves of the wireless earpieces 102 that fit into the ear of the user 101 may be interchangeable to find a suitable shape and configuration. The wireless earpieces 102 may include a number of sensors and input devices including, but not limited to, pulse oximeters, microphones, pulse rate monitors, accelerometers, gyroscopes, light sensors, global positioning sensors, and so forth. Sensors of the virtual reality headset 110 may also be configured to wirelessly communicate with the wireless earpieces 102.

The virtual reality headset 110 replicates or displays an environment simulating physical presence in places in the real world or imagined worlds and lets the user 101 interact in that environment. Virtual reality may also be referred to as immersive multimedia and may be utilized to create sensory experiences which may include sight, hearing, touch, smell, and taste. The virtual reality headset 110 may be powered by a power plug, battery, or other connection (e.g., USB connection to a computing or gaming device). The virtual reality headset 110 may also communicate (send and receive) data utilizing a wired or wireless connection to any number of computing, communications, or entertainment devices.

The visor 112 may be utilized to display visual and graphical information to the user 101. The visor 112 may include one or more displays (e.g., liquid crystal displays, light emitting diode (LED) displays, organic LED, etc.) or projectors (direct, indirect, or refractive) for displaying information to the eyes of the user 101. Although not shown, the virtual reality headset 110 may also include touch screens, tactile interfaces, vibration components, smell interfaces, or tasting interfaces for enhancing the experience of the user 101. The size and shape of the virtual reality headset 110, visor 112, and the strap 114 may vary by make, model, manufacturer as well as user configuration of the virtual reality headset 110, such as those produced by Google, HTC, Sony, Oculus, Epson, Samsung, LG, Microsoft, Durovis, Valve, Avegant, and others. In one embodiment, the visor 110 may be transparent or see through allowing the user to interact and function in the real-world while still communicating virtual information. For example, the wireless earpieces 102, visor 112, virtual reality headset 110 may be configured for augmented reality functionality, processes, displays, and so forth as are herein described.

The strap 114 extends between sides of the visor 112 and is configured to secure the virtual reality headset 110 to the head of the user 101. The strap 114 may be formed of any number of materials, such as cotton, polyester, nylon, rubber, plastic, or so forth. The strap 114 may include buckles, loops, or other adjustment mechanisms for fitting the virtual reality headset 110 to the head of the user 101. The strap 114 may be flexible to comfortably fit to the head of the user 101.

The wireless earpieces 102 may communicate utilizing any number of wireless connections, standards, or protocols (e.g., near field communications, Bluetooth, Wi-Fi, ANT+, etc.). The virtual reality headset 110 may locally or remotely implement and utilize any number of operating systems, kernels, instructions, or applications that may make use of the sensor data measured by the wireless earpieces 102. For example, the virtual reality headset 110 may utilize any number of android, iOS, Windows, open platform, or other systems. Similarly, the virtual reality headset 110 may include a number of applications that utilize the biometric data from the wireless earpieces 102 to display applicable information and data. For example, the biometric information (including, high, low, average, or other values) may be processed by the wireless earpieces 102 or the virtual reality headset 110 to display heart rate, blood oxygenation, altitude, speed, distance traveled, calories burned, or other applicable information.

In one embodiment, the virtual reality headset 110 may include any number of sensors (e.g., similar to those described with regard to the wireless earpieces 102) that may be utilized to augment the sensor readings of the wireless earpieces 102. For example, a microphone of the wireless device 110 may determine an amount and type of ambient noise. The noise may be analyzed and utilized to filter the sensor readings made by the wireless earpieces 102 to maximize the accuracy and relevance of the sensor measurements of the wireless earpieces 102. Filtering, tuning, and adaptation for the sensor measurements may be made for signal noise, electronic noise, or acoustic noise, all of which are applicable in the system 100. The virtual reality headset 110 may also include accelerometers, gyroscopes, magnetometers, radar sensors, and so forth that determine the location, position, and orientation of the user 101 within the system 100 which may represent a number of indoor or outdoor environments. Sensor measurements made by either the wireless earpieces 102, virtual reality headset 110, or sensor devices of the user 101 may be communicated with one another in the system 100.

With respect to the wireless earpieces 102 sensor measurements may refer to measurements made by one or both of the wireless earpieces 102. For example, the wireless earpieces 102 may determine that the sensor signal for the pulse oximeter of the right wireless earpiece is very noisy and as a result, may utilize the sensor signal from the pulse oximeter of the left wireless earpiece as the primary measurement. The wireless earpieces 102 may also switch back and forth between pulse oximeters of the left earpiece 106 and the right earpiece 104 in response to varying noise for both of the wireless earpieces. As a result, the clearest sensor signal may be utilized at any given time. In one embodiment, the wireless earpieces 102 may switch sensor measurements in response to the sensor measurements exceeding or dropping below a specified threshold.

The user 101 may also be wearing or carrying any number of sensor-enabled devices, such as heart rate monitors, pacemakers, smart glasses, smart watches or bracelets (e.g., Apple watch, Fitbit, etc.), or other sensory devices that may be worn, attached to, or integrated with the user 101. The data and information from the external sensor devices may be communicated to the wireless earpieces 102. In another embodiment, the data and information from the external sensor devices may be utilized to perform additional processing of the information sent from the wireless earpieces 102 to the virtual reality headset 110.

The sensors of the wireless earpieces 102 may also be positioned at enantiomeric locations. For example, a number of colored light emitting diodes may be positioned to provide variable data and information, such as heart rate, respiratory rate, and so forth. The data gathered by the LED arrays may be sampled and used alone or in aggregate with other sensors. As a result, sensor readings may be enhanced and strengthened with additional data.

Figure 2:
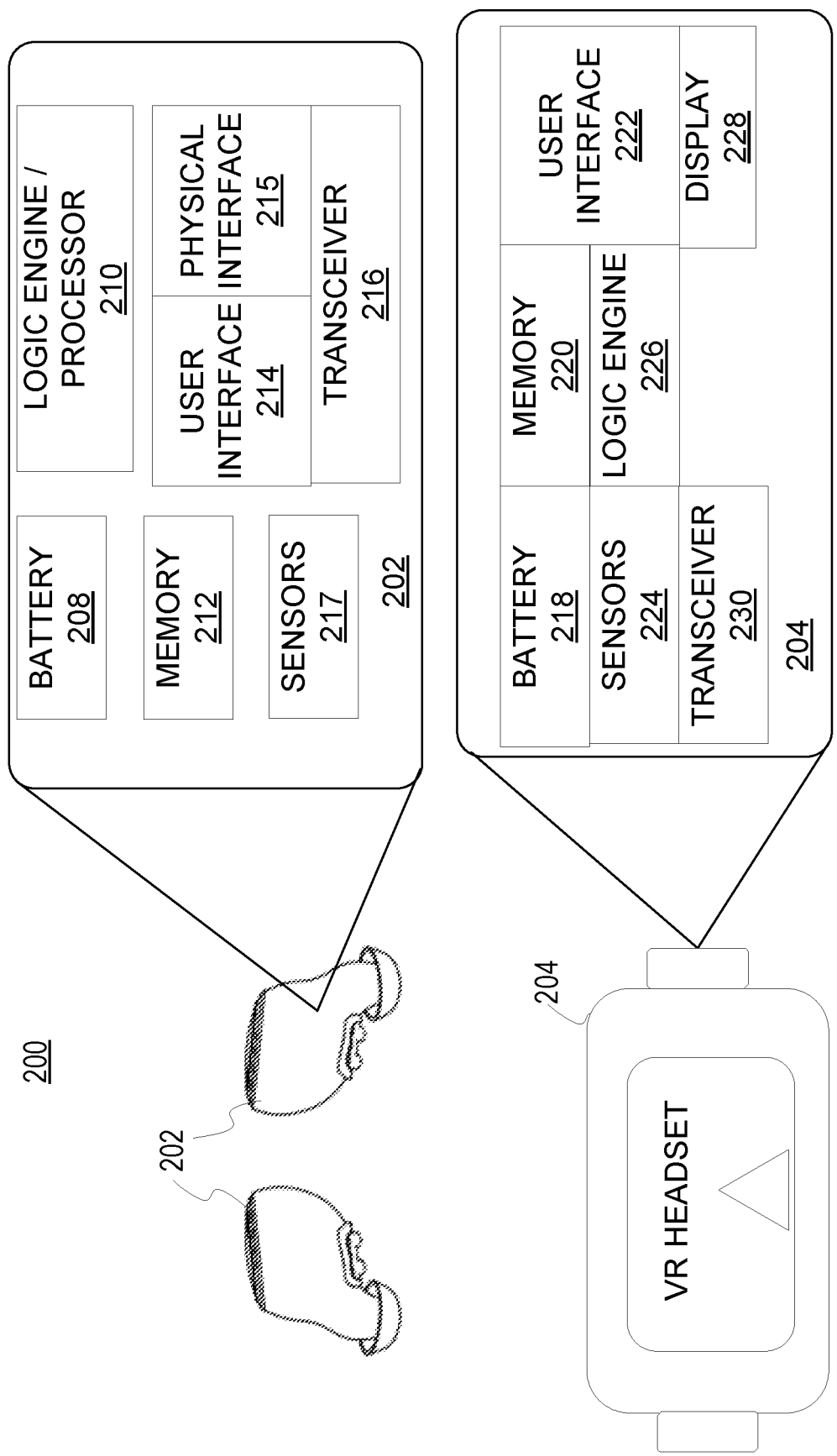
FIG. 2 is a block diagram of wireless earpieces and virtual reality headset in accordance with an illustrative embodiment.

FIG. 2 is a block diagram of a virtual reality system 200 in accordance with an illustrative embodiment which may be the same as the system 100 shown in FIG. 1. In one embodiment, the virtual reality system 200 may include wireless earpieces 202 (described collectively rather than individually) and virtual reality headset 204. The virtual reality headset 204 may include or be connected to a virtual reality computing or communications system, such as a gaming device, server, personal computing device, or so forth. In one embodiment, the wireless earpieces 202 may enhance communications and functionality of the virtual reality system 200. For example, the wireless earpieces 202 may provide high quality audio that compliments the virtual environments provided by the virtual reality headset 204. In addition, the wireless earpieces 202 may include sensors 217 that detect the location, position, orientation, movement, and acceleration of the user for providing feedback to the virtual reality headset 204. The sensors 217 may augment the measurements taken by the virtual reality headset 204

As shown, the wireless earpieces 202 may be physically or wirelessly linked to the virtual reality headset 204. User input and commands may be received from either the wireless earpieces 202 or the virtual reality headset 204 for implementation on either of the devices of the virtual reality system 200 (or other externally connected devices). As previously noted, the wireless earpieces 202 may be referred to or described herein as a pair (wireless earpieces) or singularly (wireless earpiece). The description may also refer to components and functionality of each of the wireless earpieces 202 collectively or individually.

The wireless earpieces 202 play the audio corresponding to the virtual reality content displayed by the virtual reality headset 204. In one embodiment, the wireless earpieces 202 may play the sounds and audio received from the virtual reality headset 204 based on the sensed location, position, orientation, speed, and acceleration of the user as measured by the sensors 217. For example, if the user's head is inclined as if he is writing or simulating writing a bicycle, the corresponding audio may be played to simulate actually riding a bike and the way be sounds and noises may strike the ears of the user. In another example, the audio and sounds may be played as if the user's head was turned a particular direction. For example, the sounds and audio may be more prominent in the left ear rather than the right ear based on the position and orientation of the user stimulated by the wireless earpieces 202. In addition, the wireless earpieces 202 may provide additional biometric and user data that may be further utilized by the virtual reality headset 204 or connected computing, entertainment, or communications In some embodiments, the virtual reality headset 204 may act as a logging tool for receiving information, data, or measurements made by the wireless earpieces 202. For example, the virtual reality headset 204 may be worn by the user to download data from the wireless earpieces in real-time. As a result, the virtual reality headset 204 may be utilized to store, display, and synchronize data to the wireless earpieces 202. For example, the virtual reality headset 204 may display pulse, oxygenation, distance, calories burned, and so forth as measured by the wireless earpieces 202. The wireless earpieces 202 and the virtual reality headset 204 may have any number of electrical configurations, shapes, and colors and may include various circuitry, connections, and other components.

In one embodiment, the wireless earpieces 202 may include a battery 208, a logic engine or processor 210, a memory 212, user interface 214, physical interface 215, a transceiver 216, and sensors 212. Similar components within the virtual reality headset 204 may be similarly structured to provide analogous functionality, features, and processes. Likewise, the virtual reality headset 204 may have a battery 218, a memory 220, a user interface 222, sensors 224, a logic engine 226, a display 228, and a transceiver 230. The battery 208 is a power storage device configured to power the wireless earpieces 202. Likewise, the battery 218 is a power storage device configured to power the virtual reality headset 204. The battery 218 may represent a converter, inverter, or interface for receiving power and/or communications from a virtual reality processing system (not shown). In other embodiments, the batteries 208 and 218 may represent a fuel cell, thermal electric generator, piezo electric charger, solar charger, ultra-capacitor, or other existing or developing power storage technologies.

The logic engine 210 is the logic that controls the operation and functionality of the wireless earpieces 202. The logic engine 210 may include one or more processors. The logic engine 210 may include circuitry, chips, and other digital logic. The logic engine 210 may also include programs, scripts, and instructions that may be implemented to operate the logic engine 210. The logic engine 210 may represent hardware, software, firmware, or any combination thereof. In one embodiment, the logic engine 210 may include one or more processors. The logic engine 210 may also represent an application specific integrated circuit (ASIC) or field programmable gate array (FPGA). The logic engine 210 may utilize information from the sensors 212 to determine the biometric information, data, and readings of the user. The logic engine 210 may utilize this information and other criteria to inform the user of the biometrics (e.g., audibly, through an application of a connected device, tactilely, etc.). The logic engine 210 may also determine the location, orientation, position, speed, and acceleration of the user utilizing the sensors 217. For example, the sensors 217 may include accelerometers, gyroscopes, optical sensors, or miniaturized radar that may be utilized to determine associated user information. The logic engine 210 may also control how audio information is both sent and received from the transceiver 216 of the wireless earpieces 202.

The logic engine 210 may also process user input to determine commands implemented by the wireless earpieces 202 or sent to the wireless earpieces 204 through the transceiver 216. The user input may be determined by the sensors 217 to determine specific actions to be taken. In one embodiment, the logic engine 210 may implement a macro allowing the user to associate user input as sensed by the sensors 217 with commands.

In one embodiment, a processor included in the logic engine 210 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications elements of a smart case.

The memory 212 is a hardware element, device, or recording media configured to store data for subsequent retrieval or access at a later time. The memory 212 may be or include static and/or dynamic memory. The memory 212 may include one or more of a hard disk, random access memory, cache, removable media drive, mass storage, or configuration suitable as storage for data, instructions, and information. In one embodiment, the memory 212 and the logic engine 210 may be integrated. The memory may use any type of volatile or non-volatile storage techniques and mediums. The memory 212 may store information related to the status of a user, wireless earpieces 202, virtual reality headset 204, and other peripherals, such as a wireless device, smart case for the wireless earpieces 202, smart watch, and so forth. In one embodiment, the memory 212 may display instructions or programs for controlling the user interface 214 including one or more LEDs or other light emitting components, speakers, tactile generators (e.g., vibrator), and so forth. The memory 212 may also store the user input information associated with each command.

The transceiver 216 is a component comprising both a transmitter and receiver which may be combined and share common circuitry on a single housing. The transceiver 216 may communicate utilizing Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.) or other suitable radio frequency standards, networks, protocols, or communications. The transceiver 216 may also be a dual or hybrid transceiver that supports a number of different communications. For example, the transceiver 216 may communicate with the virtual reality headset 204 or other systems utilizing wired interfaces (e.g., wires, traces, etc.), NFC or Bluetooth communications.

The components of the wireless earpieces 202 (or the virtual reality system 200) may be electrically connected utilizing any number of wires, contact points, leads, busses, wireless interfaces, or so forth. In addition, the wireless earpieces 202 may include any number of computing and communications components, devices or elements which may include busses, motherboards, circuits, chips, sensors, ports, interfaces, cards, converters, adapters, connections, transceivers, displays, antennas, and other similar components. The physical interface 215 is hardware interface of the wireless earpieces 202 for connecting and communicating with the virtual reality headset 204 or other electrical components.

The physical interface 215 may include any number of pins, arms, or connectors for electrically interfacing with the contacts or other interface components of external devices or other charging or synchronization devices. For example, the physical interface 215 may be a micro USB port. In one embodiment, the physical interface 215 is a magnetic interface that automatically couples to contacts or an interface of the virtual reality headset 204. In another embodiment, the physical interface 215 may include a wireless inductor for charging the wireless earpieces 202 without a physical connection to a charging device.

The user interface 214 is a hardware interface for receiving commands, instructions, or input through the touch (haptics) of the user, voice commands, or predefined motions. The user interface 214 may be utilized to control the other functions of the wireless earpieces 202. Although not shown, the one or more speakers of the user interface 214 may include a number of speaker components (e.g., signal generators, amplifiers, drivers, and other circuitry) configured to generate sounds waves at distinct frequency ranges (e.g., bass, woofer, tweeter, midrange, etc.) or to vibrate at specified frequencies to be perceived by the user as sound waves. The speakers may also generate sound waves to provide three dimensional stereo sound to the user. All or portions of the speakers may be activated or directed within the wireless earpieces 202 to generate various effects. The speakers may quickly respond to content sent from the virtual reality headset 204 or other portions of the virtual reality system 200 to add to the realistic effects and processing experienced by the user. The user interface 214 may include an LED array, one or more touch sensitive buttons or screens, portions or sensors, a miniature screen or display, or other input/output components. The user interface 214 may be controlled by the user or based on commands received from the virtual reality headset 204 or a linked wireless device. The user interface 214 may also include traditional software interfaces, such as a graphical user interface or applications that may be executed by the logic engine 210 for communication by the user interface 214. For example, the speakers may simulate users, devices, or sounds spatially positioned relative to the user wearing the wireless earpieces 202. As a result, a person or animal that appears to be forward and to the left of the user will also sound like they are so positioned based on sounds received and played by the wireless earpieces 202 relative to the communicated media content.

In one embodiment, the user may provide feedback by tapping the user interface 214 once, twice, three times, or any number of times. Similarly, a swiping motion may be utilized across or in front of the user interface 214 (e.g., the exterior surface of the wireless earpieces 202, proximate the exterior surface for optical sensors) etc.) to implement a predefined action. Swiping motions in any number of directions may be associated with specific activities, such as play music, pause, fast forward, rewind, activate a digital assistant (e.g., Siri, Cortana, smart assistant, etc.). The swiping motions may also be utilized to control actions and functionality of the virtual reality headset 204 or other external devices (e.g., smart television, camera array, smart watch, etc.). The user may also provide user input by moving her head in a particular direction or motion or based on the user's position or location. For example, the user may utilize voice commands, head gestures, or touch commands to change the content displayed by the virtual reality headset 204. The voice and audio input from the user and received from the virtual reality system 200 may be enhanced to accurately determine position, location, orientation, motion and acceleration of the user/user's head within a three dimensional space. As a result, audio or sound effects, such as loudness, masking, pitch (including changes, such as the Doppler effect), timbre, localization, and other user affects heard and perceived by the user.

The sensors 217 may include pulse oximeters, accelerometers, gyroscopes, magnetometers, inertial sensors, photo detectors, microphones (e.g., ear-bone or bone conduction microphones, exterior microphones, etc.) miniature cameras, and other similar instruments for detecting location, orientation, motion, and so forth. The sensors 217 may also be utilized to gather optical images, data, and measurements and determine an acoustic noise level, electronic noise in the environment, ambient conditions, and so forth. The sensors 217 may provide measurements or data that may be utilized to filter or select images for display by the virtual reality headset 204. For example, motion or sound detected on the left side of the user may be utilized to command the smart glasses to display camera images from the left side of the user. Motion or sound may be utilized, however, any number of triggers may be utilized to send commands to the virtual reality headset 204.

The microphones of the sensors 217 may immediately receive and process audio signals and sounds from the user thereby minimizing latency and delay. As a result, the virtual reality system 200 may perform effectively for real-time scenarios, simulations, games, communications, or so forth. The microphones may also sense verbal feedback from the user as well as audio input associated with the user and environment (e.g., foot falls, breaths, grunts, wind, etc.) to provide relevant information to the virtual reality system 200.

The virtual reality headset 204 may include components similar in structure and functionality to those shown for the wireless earpieces 202 including a battery 218, a memory 220, a user interface 222, sensors 224, a logic engine 226, a display 228, and transceiver 230. The virtual reality headset 204 may include the logic engine 226 for executing and implementing the processes and functions as are herein described. The battery 218 of the virtual reality headset 204 may be integrated into the frames of the virtual reality headset 204 and may have extra capacity which may be utilized to charge the wireless earpieces 202. For example, the wireless earpieces 202 may be magnetically coupled or connected to the virtual reality headset 204 so that the battery 218 may be charged. All or a portion of the logic engine 226, sensors, user interface 222, sensors 224, display, and transceiver 230 may be integrated in the frame and/or lenses of the virtual reality headset 204.

The user interface 222 of the virtual reality headset 204 may include a touch interface or display for indicating the status of the virtual reality headset 204. For example, an external LED light may indicate the battery status of the virtual reality headset 204 as well as the connected wireless earpieces 202, connection status (e.g., linked to the wireless earpieces 202, wireless device, etc.), download/synchronization status (e.g., synchronizing, complete, last synchronization, etc.), or other similar information.

The display 228 may be integrated into the lenses of the virtual reality headset 204 or represent one or more projectors that may project content directly or reflectively to the eyes of the user. For example, the display 228 may represent a transparent organic light emitting diode lens that is see through and may be utilized to display content. Projectors of the display 228 may utilize any number of wavelengths or light sources to display data, images, or other content to the user. The virtual reality headset 204 may also be utilized for augmented reality displays. The virtual reality headset 204 may take any number of forms including regular glasses, disposable headsets, and so forth. The virtual reality headset 204 may be very small and unobtrusive. In one embodiment, the virtual reality headset 204 may be integrated in smart contact lenses that communicate with the wireless earpieces 202 as described herein.

An LED array of the user interface 222 may also be utilized for display actions. For example, an LED may be activated in response to someone or something being in the user's blind spot while riding a bicycle. In another embodiment, device status indications may emanate from the LED array of the wireless earpieces 202 themselves, triggered for display by the user interface 222 of the virtual reality headset 204. The battery 218 may itself be charged through a physical interface of the user interface 222. The physical interface may be integrated with the user interface 222 or may be a separate interface. For example, the user interface 222 may also include a hardware interface (e.g., port, connector, etc.) for connecting the virtual reality headset 204 to a power supply or other electronic device. The user interface 222 may be utilized for charging as well as communications with externally connected devices. For example, the user interface 222 may represent a mini-USB, micro-USB or other similar miniature standard connector. In another embodiment, a wireless inductive charging system may be utilized to initially replenish power to the wireless earpieces 202. The virtual reality headset 204 may also be charged utilizing inductive charging.

In another embodiment, the virtual reality headset 204 may also include sensors for detecting the location, orientation, and proximity of the wireless earpieces 202. For example, the virtual reality headset 204 may include optical sensors or cameras for capturing images and other content around the periphery of the user (e.g., front, sides, behind, etc.). The virtual reality headset 204 may detect any number of wavelengths and spectra to provide distinct images, enhancement, data, and content to the user. The virtual reality headset 204 may also include an LED array, galvanic linkage or other touch sensors, battery, solar charger, actuators or vibrators, one or more touch screens or displays, an NFC chip, or other components. The sensors 224 may include integrated sensors that are part of the virtual reality headset 204 as well as external sensors that communicate with the virtual reality headset 204. For example, the sensors 224 may also measure the position, location, orientation, motion, and acceleration of other portions of the user's body including arms, legs, torso, and so forth.

As originally packaged, the wireless earpieces 202 and the virtual reality headset 204 may include peripheral devices such as charging cords, power adapters, inductive charging adapters, solar cells, batteries, lanyards, additional light arrays, speakers, smart case covers, transceivers (e.g., Wi-Fi, cellular, etc.), or so forth.

Figure 3:
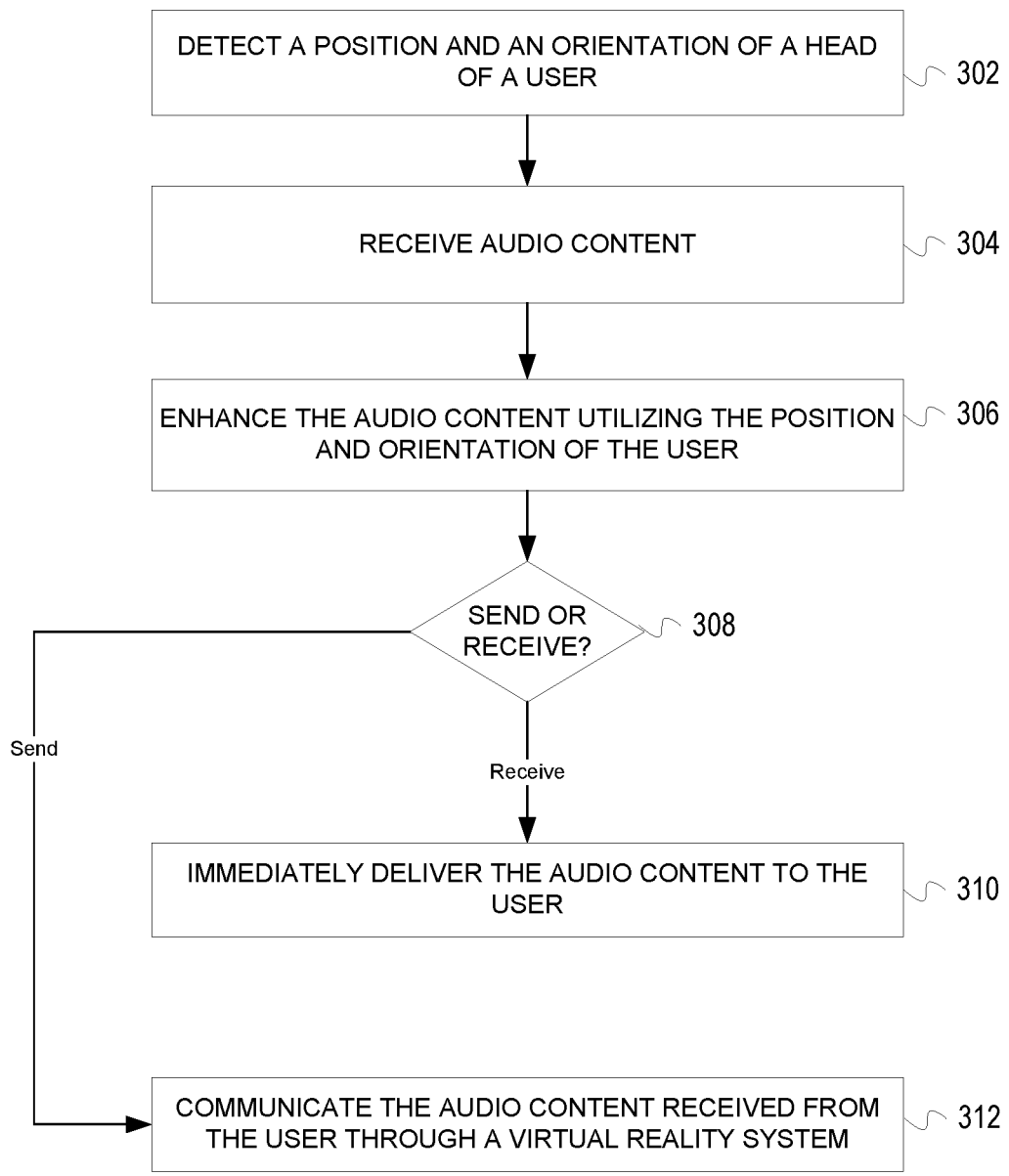
FIG. 3 is a flowchart of a process for communicating with a virtual reality headset in accordance with an illustrative embodiment.

FIG. 3 is a flowchart of a process for communicating with a virtual reality headset in accordance with an illustrative embodiment. In one embodiment, the process of FIG. 3 may be implemented by one or more wireless earpieces, such as the wireless earpieces 102 of FIG. 1 or wireless earpieces 202 of FIG. 2. The method of FIG. 3 may be performed to communicate information by and between the wireless earpieces and a virtual reality headset. The wireless earpieces may synchronize playback of three dimensional sound and audio. The wireless earpieces may also synchronize the location, orientation, and position of the user to display accurate virtual information, such as location, position, angle, and motion of the user's head (as well as body), and so forth. In addition to the virtual reality headset, the wireless earpieces may communicate with one or more electronic devices, such as a smart case, wireless devices, computing devices, entertainment devices, medical devices, or so forth, to perform the method of FIG. 3. The wireless earpieces may be physically or virtually connected to the virtual reality headset and/or a virtual reality communications or computing system (e.g., gaming system, personal computer, cell phone, etc.). For example, the wireless earpieces may be connected by a wire interface that both powers the wireless earpieces and communicates and receives audio content from the wireless earpieces.

In one embodiment, the process may begin by detecting a position and an orientation of a head of a user (step 302). The position and the orientation of the user's head may be determined utilizing one or more accelerometers, gyroscopes, proximity sensors, optical sensors, or other sensors of the wireless earpieces or the virtual reality headset. The wireless earpieces may also determine information based on a user selected activity or activity detected by the wireless earpieces. For example, if the user has selected a biking simulation or activity, the wireless earpieces may expect a corresponding head position and orientation. The position and orientation may include global positioning information, spatial positioning within a room or other environment, x, y, and z orientation of the user's head utilizing any number of planes or axis, distance between objects (e.g., user's head and the floor/wall, etc.).

Next, the wireless earpieces receive audio content (step 304). The audio content may be received from the virtual reality headset. In one embodiment, the audio content may be integrated material or content from a simulation, game, broadcast, or other media. As previously noted, the audio content may be received by a transceiver of the wireless earpieces through a physical or wireless connection for processing. The audio content may also be received from the user by one or more microphones of the wireless earpieces including ear-bone and external microphones to detect the voice, sounds, or other audio input from the user. The microphones may also sense content associated with the user's environment, such as other users proximate the user, organic, mechanical, or electric sounds, or so forth.

Next, the wireless earpieces enhance the audio content utilizing the position and orientation of the user (step 306). In one embodiment, the position, orientation, and audio content received from the user (e.g. verbal commands, indicators, stimuli, etc.) may be associated with specific commands or actions implemented by the wireless earpieces, the virtual reality headset, or other computing or communications systems in communication with the wireless earpieces. For example, a combination of the position, orientation, and audio content may be stored in a database with associated actions, commands, communications, scripts, applications, or processes that may be implemented or executed. The audio content may also be enhanced utilizing filtering, amplification, signal processing, and other processes to remove unwanted noise, jitter, latency, or so forth.

Next, the wireless earpieces determine whether to send or receive the audio content (step 308). The wireless earpieces determine whether the audio content was received from the user through one or more microphones (e.g., ear-bone, external, etc.) for communication to the virtual reality headset/system or from the virtual reality headset/system to be played by the wireless earpieces.

If the wireless earpieces determine to receive the audio content, the wireless earpieces immediately deliver the audio content to the user (step 310). The audio content is delivered without significant delay or latency. As a result, any potential video, pictures, or other visual content may be synchronized with the audio content delivered by the wireless earpieces to prevent unwanted dizziness, disorientation, or motion sickness due to differing inputs. The immediate delivery of the audio content may ensure that real-time or time sensitive applications, such as communications, gaming, simulations, or so forth are implemented without delay. As previously noted, the audio content may be received from the virtual reality headset/system utilizing any number of connections. Any number of pins or connectors may interconnect the components. In another embodiment, the virtual reality headset is magnetically coupled to the wireless earpieces allowing for inductive power transfer and communication between the connectors and the wireless earpieces. In yet other embodiments, short range wireless signals, such as Bluetooth, ANT+, or other radiofrequency protocols, standards, or connections may be utilized.

The playback and communication of audio content may be coordinated based on user actions, conditions, position, location, or so forth. For example, specific three dimensional noises may be played in each of the wireless earpieces corresponding to the left and right ears of the user to make the environment seem more realistic. Likewise, the volume and other audio effects may be varied to match the orientation of the user's head (or avatar) within a virtual environment. The audio content may include flags, timestamps, or other information for synchronizing playback. The synchronization of the audio and visual content may ensure that the user does not become disoriented, motion sick, or otherwise adversely affected. The audio content may be delivered, played, or otherwise communicated based on synchronization information determined between the virtual reality headset and the wireless earpieces. For example, the left and right wireless earpieces may play distinct content based on the virtual reality environment with which the user is interacting. Distinct sounds, volumes, and audio effects may be utilized by each of the wireless earpieces. As a result, the user is able to experience a unique virtual environment with corresponding sounds without significant increases in weight or other forces imposed upon the user by much larger sound systems.

If the wireless earpieces determine to send the audio content, the wireless earpieces communicate the audio content received from the user through a virtual reality system (step 312). The audio content may be sent from a transceiver of the wireless earpieces to the virtual reality system/headset for processing. For example, the audio content may be communications, commands, or other audio/verbal feedback. The enhanced reception of quality audio input received through the microphones of the wireless earpieces may enhance the interactive functionality of the wireless earpieces due to reduced delay, latency, and so forth.

Although, not specifically described, the process of FIG. 3 may begin with the wireless earpieces being linked with a virtual reality headset. In one embodiment, the user may couple the wireless earpieces with the virtual reality headset. For example, each side of the virtual reality headset may include a connector corresponding to the left and right wireless earpieces. The wireless earpieces may include contacts that couple the two devices to communicate data as well as provide a power connection for powering the wireless earpieces utilizing power provided by the virtual reality headset (e.g., battery, power adapter, USB connection, etc.). The contacts may be in the form of a magnetic connector. In another embodiment, either of the wireless earpieces or the virtual reality headset may include connectors and ports for physically connecting to one another. The two devices may also communicate utilizing an inductive connection between the wireless earpieces and the virtual reality headset. In another embodiment, the wireless earpieces and the connectors of the virtual reality headset may utilize short range communications, such as Bluetooth, ANT+, or other radiofrequency communications to communicate. The wireless earpieces may be integrated with her connected to connectors, extensions, arms, the frame, or other portions of the virtual reality headset.

The wireless earpieces may also synchronize playback or communication of the audio content with visual content of the virtual reality system. As previously noted, the wireless earpieces may utilize any number of sensors to determine the location, velocity (e.g. linear, angular, etc.), position of the user (and the user's head), orientation, acceleration, biometric condition (e.g., heart rate, blood oxygenation, temperature, etc.), and other information to adjust the exact timing, volume, tuning, balance, fade, and other audio effects communicated to the user by the speakers of the wireless earpieces. The wireless earpieces may also send or receive commands for synchronizing and managing the audio content played or communicated by the wireless earpieces with associated visual content.

FIG. 4 illustrates the sensors 217 of FIG. 2 in more detail. As shown in FIG. 4, the sensors 217 may include inertial sensors such as one or more accelerometers, magnetometers, and/or gyros. Each of the earpieces may have its own inertial sensors. The sensors 217 may also include biometric sensors such as pulse oximeters, temperature sensors, or other types of physiological sensors 242. The sensors 217 may further include one or more microphones 243 which may be air conduction microphones or bone conduction microphones. The sensors 217 may include one or more cameras 239 as well.

Figure 5:
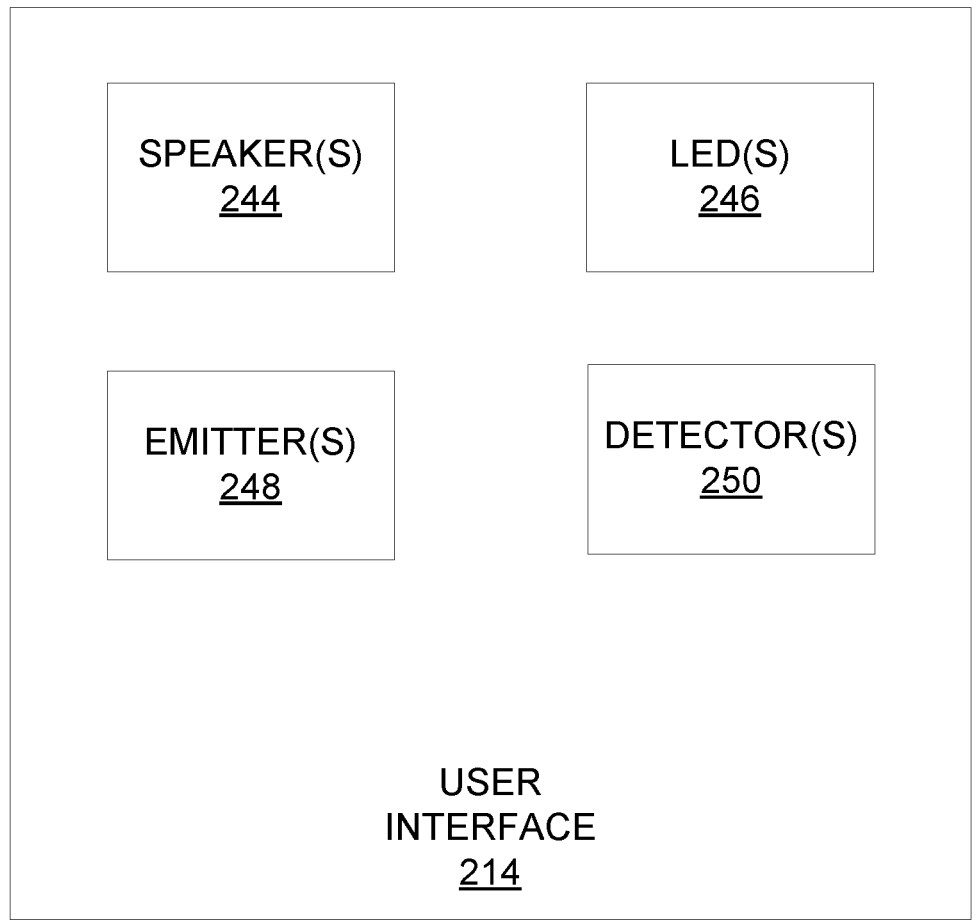
FIG. 5 illustrates examples of user interface components.

FIG. 5 further illustrates that the user interface 214 may include one or more speakers 244, one or more LEDs 246. In addition, a gestural interface may be provided as previously described which allows for taps or swipes or other input from a user. Such an interface may be provided in various ways such as using optical emitters 248 and detectors 250. It is contemplated that the gestural interface may be provided using capacitance sensing or other technologies instead. It is also to be understood that although certain components are shown as a part of the user interface, that the sensors previously described may also be used in order to provide input from a user. For example, voice input may be provided through one or more microphones, head motion may be provided through one or more inertial sensors and biological feedback may be provided via one or more physiological sensors.

The illustrative embodiments provide a system, method, and wireless earpiece(s) for enhancing audio communications utilizing a virtual reality system. Audio input that is both sent and received through the wireless earpieces may be enhanced and delivered based on user information that may include the location, position, orientation, motion, and acceleration of the user. The user information may be utilized to more effectively deliver audio content for the user as well as to interact with media content of the virtual reality or augmented reality system. The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a non-transitory machine-readable medium having stored thereon instructions, which may be used to program a computing system (or other electronic device(s)) to perform a process according to embodiments, whether presently described or not, since every conceivable variation is not enumerated herein.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

The illustrative embodiments are not to be limited to the particular embodiments described herein and it is to be understood that features from different embodiments may, but need not be combined. In particular, the illustrative embodiments contemplate numerous variations in the type of ways in which embodiments may be applied. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for communicating with a virtual reality system, comprising:
    determining a position and an orientation of a head of a user utilizing one or more inertial sensors of a first wireless earpiece and one or more inertial sensors of a second wireless earpiece, each of the first wireless earpiece and the second wireless earpiece are configured to be inserted into an ears of the user, wherein the first wireless earpiece and the second wireless earpiece are configured to wirelessly communicate with one another and at least one of the first wireless earpiece and the second wireless earpiece are configured to process inertial data from the inertial sensors of the first wireless earpiece and the second wireless earpiece to determine the position and or direction of the head of the user;
    communicating the position and the orientation of the head of the user to the virtual reality system;
    receiving audio content from the virtual reality headset;
    receiving voice input from a plurality of microphones of the first wireless earpiece and or the second wireless earpiece, wherein the plurality of microphones includes at least one bone conduction microphone;
    communicating the voice input from the first wireless earpiece and or the second wireless earpiece to the virtual reality system;
    enhancing the audio content utilizing the position and the orientation of the head of the user;
    generating a response to the voice input by the virtual reality system using the voice input and the position and the orientation of the head of the user, the response comprising the audio content; and
    delivering the audio content to the user through one or more speakers of the at least one wireless earpiece.

2. The method of claim 1, further comprising:
    linking wireless earpieces with the virtual reality headset; and
    synchronizing playback of audio content with visual content displayed by the virtual reality headset utilizing the position and orientation of the head of the user.

3. The method of claim 1, further comprising:
    communicating the audio content through a virtual reality system including at least the virtual reality headset.

4. The method of claim 1 further comprising sensing audio with microphones of the at least one wireless earpiece and communicating the audio and the position and the orientation of the head of the user from the at least one wireless earpiece to the virtual reality headset.

5. The method of claim 1, further comprising:
    communicating the position and the orientation of the head of the user to the virtual reality headset.

6. The method of claim 5, wherein the audio content is based on the orientation and position of the head of the user.

7. The method of claim 1 wherein the response is generated in accordance with an activity of the user if the position and the orientation of the head of the user is indicative of the activity.

* * * * *